US 7,393,109 B2

(12) United States Patent
Arboix

(10) Patent No.: US 7,393,109 B2
(45) Date of Patent: Jul. 1, 2008

(54) METHOD AND APPARATUS FOR COOLING OPTICS

(75) Inventor: Esteban Arboix, Sundbyberg (SE)

(73) Assignee: InFocus Corporation, Wilsonville, OR (US)

(*) Notice: Subject to any disclaimer, the term of this patent is extended or adjusted under 35 U.S.C. 154(b) by 302 days.

(21) Appl. No.: 10/934,078

(22) Filed: Sep. 3, 2004

(65) Prior Publication Data

US 2006/0050242 A1 Mar. 9, 2006

(51) Int. Cl.
  G03B 21/16 (2006.01)
  G03B 21/18 (2006.01)
  G03B 21/26 (2006.01)
  G02F 1/1333 (2006.01)
  H05K 7/20 (2006.01)
  H02B 1/01 (2006.01)
  H04N 5/74 (2006.01)

(52) U.S. Cl. ............................ 353/57; 353/60; 353/61; 348/748; 349/161; 361/695; 361/831

(58) Field of Classification Search .................. 353/57, 353/52, 58, 60, 61; 349/161; 348/748; 361/688, 361/695, 703, 831
See application file for complete search history.

(56) References Cited

U.S. PATENT DOCUMENTS

| 6,443,575 | B1* | 9/2002 | Miyamoto et al. | 353/58 |
| 6,832,837 | B2* | 12/2004 | Suzuki et al. | 353/61 |
| 7,014,320 | B2* | 3/2006 | Shiraishi | 353/57 |
| 7,083,285 | B2* | 8/2006 | Hsu et al. | 353/61 |
| 7,083,286 | B2* | 8/2006 | Kim et al. | 353/61 |
| 7,140,734 | B2* | 11/2006 | Lim | 353/61 |
| 2002/0047999 | A1* | 4/2002 | Shiraishi et al. | 353/57 |
| 2004/0125343 | A1* | 7/2004 | Hara et al. | 353/57 |
| 2004/0263797 | A1* | 12/2004 | Russell et al. | 353/57 |
| 2005/0036115 | A1* | 2/2005 | Kim et al. | 353/61 |

* cited by examiner

Primary Examiner—Rochelle-Ann Blackman
(74) Attorney, Agent, or Firm—Alleman Hall McCoy Russell & Tuttle, LLP

(57) ABSTRACT

Embodiments of methods and apparatus for cooling optics are disclosed.

18 Claims, 6 Drawing Sheets

METHOD AND APPARATUS FOR COOLING OPTICS

FIELD

This application pertains to the field of projection systems, and more particularly, to the field of cooling optical components.

BACKGROUND

One difficulty that may be faced by designers and manufacturers of projection systems is that of providing adequate cooling. For example, lamps in these systems may produce a great deal of light. In LCD based projectors, much of that light may be absorbed in the projection system by polarizers and by LCD panels, along with various other components. When these components block or absorb light, heat may be produced. Excessive heat may lead to component failures.

Prior efforts to cool various components in projectors, such as LCD based projectors, include the use of blowers or fans to force air through certain areas of the projector, including in an LCD based projector the area around an x-cube. An x-cube is a prism device that receives multiple beams of light, combines the multiple beams of light, and outputs a composite beam of light. An x-cube is typically surrounded by several inlet polarizers, LCD panels, and exit polarizers. Additional fans or blowers may be used to cool other parts of the projector.

FIG. 1 is a perspective view of a portion of a prior projector 100. The shown portion may be referred to as a projector engine. The term "projector engine" as used herein is meant to denote a portion of a projector that includes various optical components. The term "projector engine" is meant to include a wide range of possible types and arrangements of optical components. Projector engine 100 includes a beam of light 105 produced by a lamp (not shown). Beam of light 105 makes its way through projector engine 100, with beam 105 possibly being split into red, green, and blue beams of visible light. These beams eventually arrive at an x-cube 140 (the x-cube is located beneath the cover labeled 140). X-cube 140 combines the beams and produces an output beam 115 that is propagated through a projection lens 110. As the red, green, and blue beams approach x-cube 140, the individual beams may pass through LCD panels and inlet and exit polarizers (not shown). The polarizers and LCD panels may then heat up and, in some cases, overheat. Here, blowers 120 and 130 are utilized to force air into the area of projector engine 100 surrounding x-cube 140. This may produce cooling of the optics.

BRIEF DESCRIPTION OF THE DRAWINGS

The claimed subject matter will be understood more fully from the detailed description given below and from the accompanying drawings of embodiments which, however, should not be taken to limit the claimed subject matter to the specific embodiments described, but are for explanation and understanding only.

DETAILED DESCRIPTION

Figure 1:
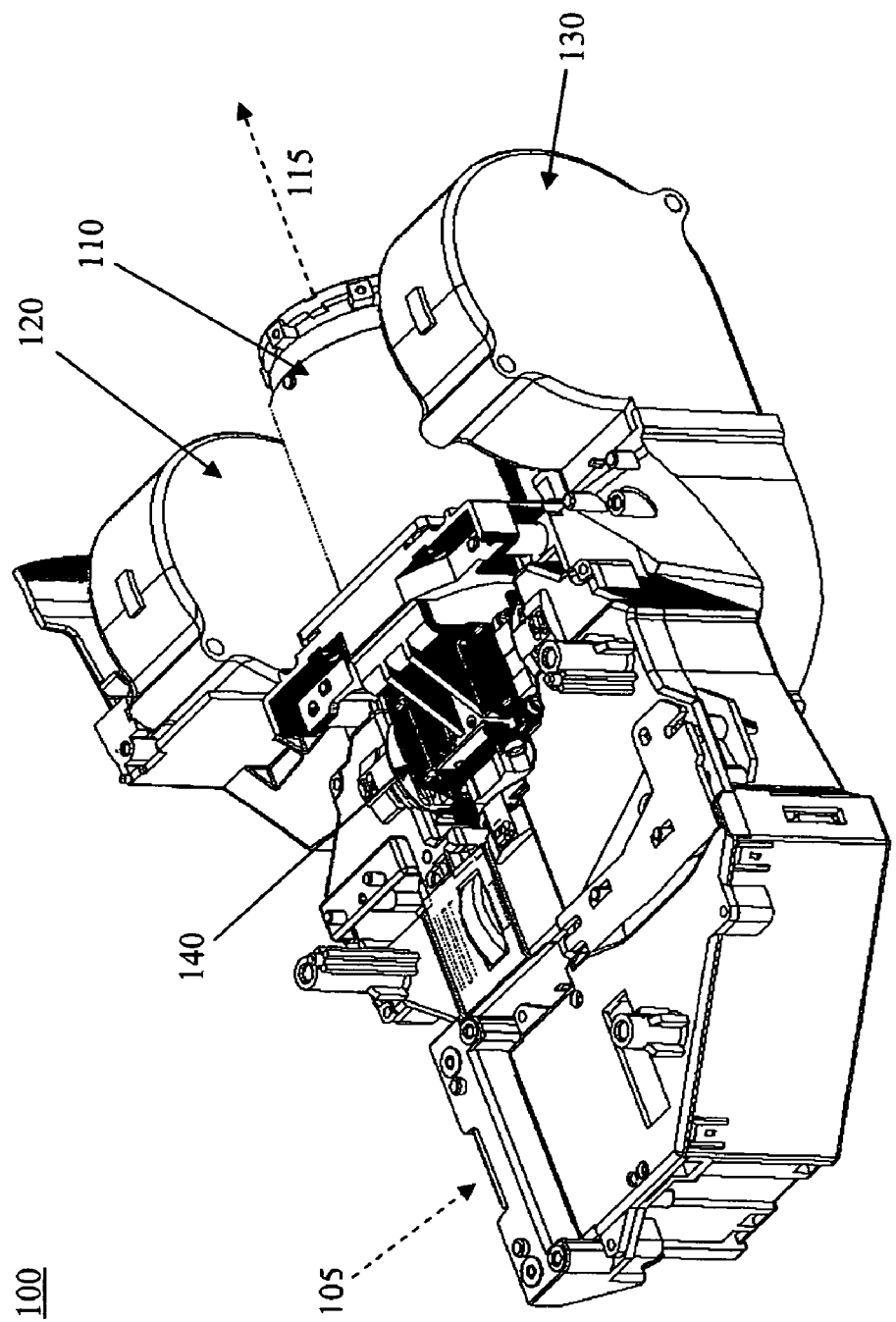
FIG. 1 is perspective view of a prior LCD projector engine.
Figure 2:
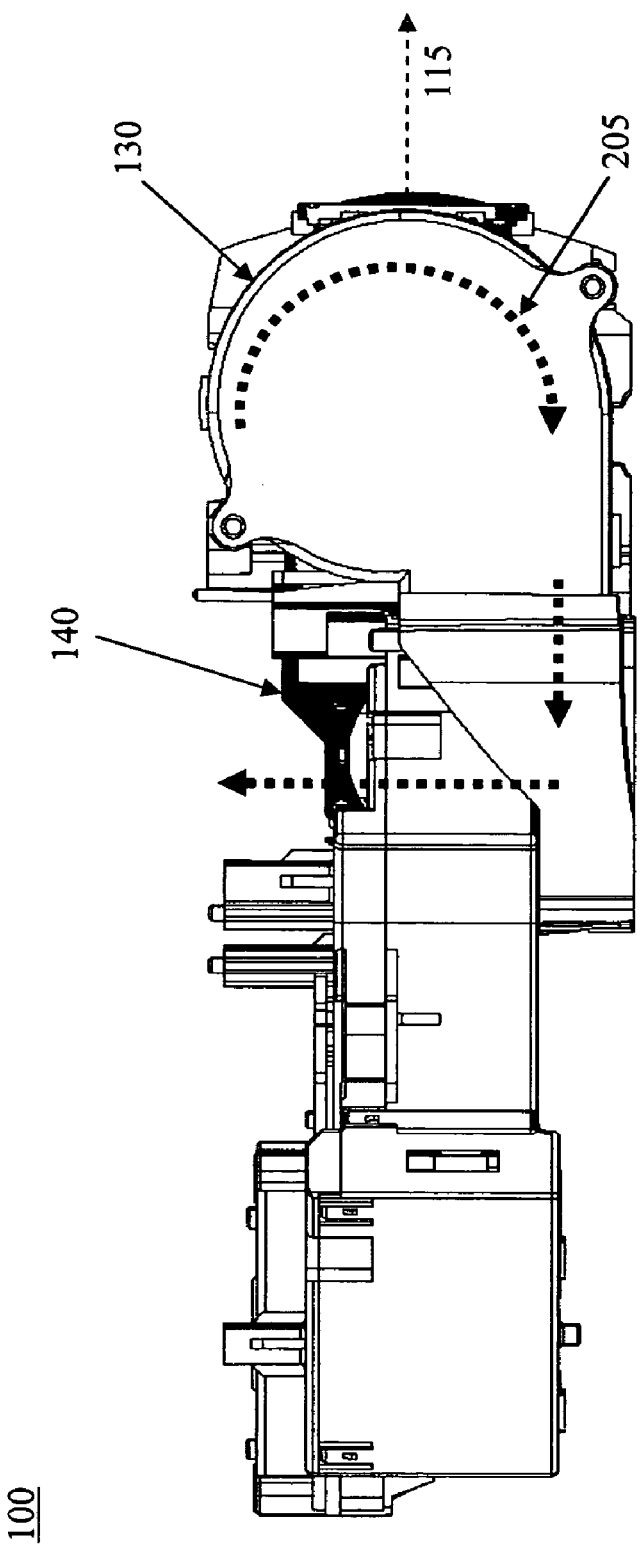
FIG. 2 is a side view of the LCD projector engine of FIG. 1.

FIG. 2 is a side view of projector engine 100. As can be seen in FIGS. 1 and 2, here, the blowers 120 and 130 are mounted in a vertical fashion, and the output stream of air 205 is forced underneath the projector engine 100. Here, air stream 205 then makes a sharp turn upward toward x-cube 140 and the polarizers and LCD panels (not shown). Air stream 205 may make further bends to reach the polarizers and the LCD panels. Further, as projectors become smaller and more portable, there is less space on the underside of the projectors for the air streams. To compensate, larger, more powerful blowers can be used. However, larger or more powerful blowers may result in undesirable noise and may also result in a larger projector and greater costs.

Figure 3:
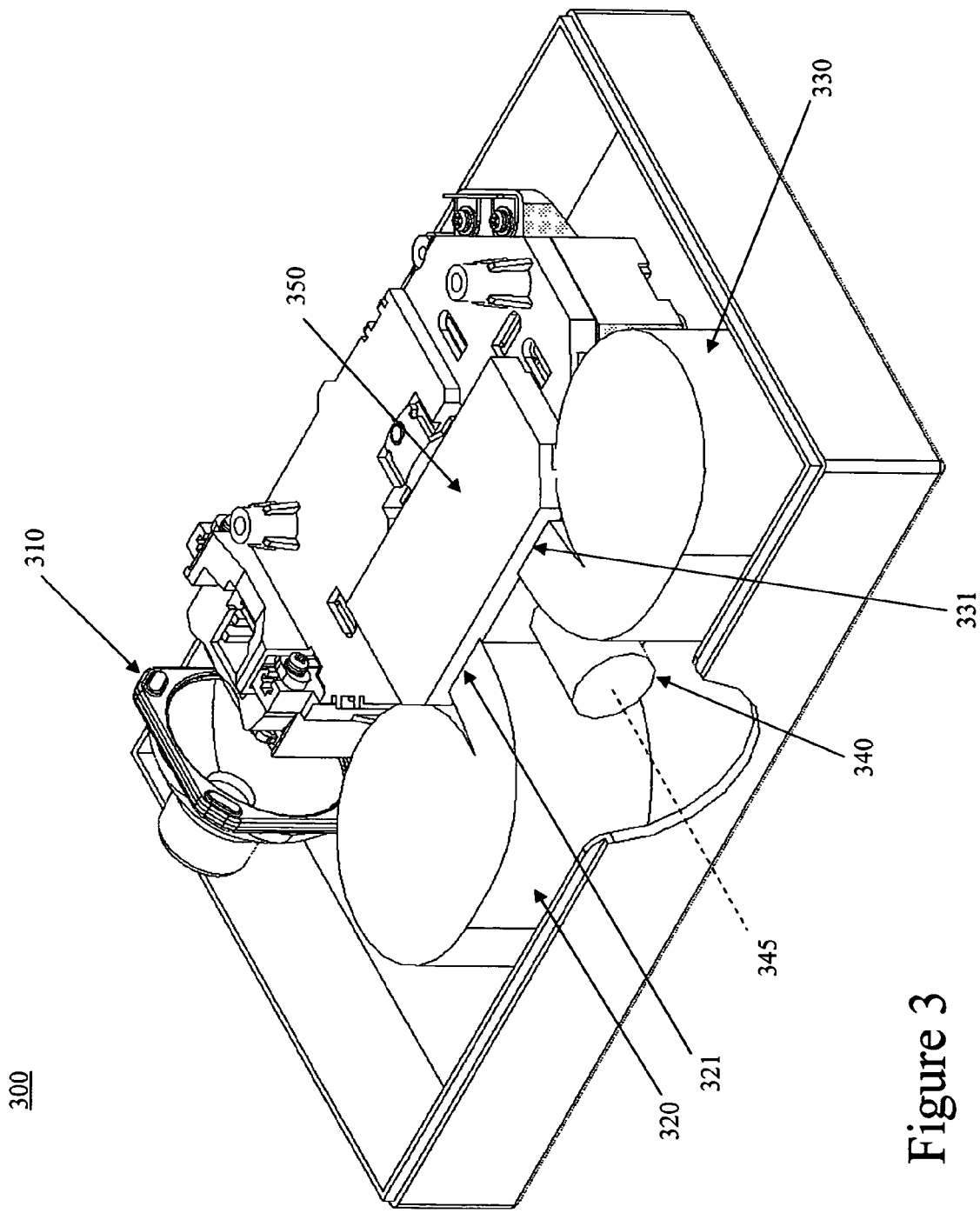
FIG. 3 is a perspective view of one embodiment of an example projector.

FIG. 3 is a perspective view of one embodiment of an example projector 300 with horizontally mounted blowers 320 and 330. In this embodiment, projector 300 includes a lamp 310, a housing 350, and a projection lens 345. An output beam of light 345 is propagated through projection lens 340. Housing 350 may contain various additional optical components, including, for example, inlet and exit polarizers, LCD panels, and an x-cube (not shown). There is a wide range of possible arrangements of the various optical components, and the claimed subject matter is not limited in scope to a particular arrangement or configuration. Further, example projector 300 may include other components, not shown, such as additional cooling fans.

For example, blowers 320 and 330 in this embodiment are mounted to a front surface of housing 350. Exhaust ports 321 and 331 of the blowers 320 and 330, respectively, are coupled to openings in the front surface of housing 350. The openings in the front surface of housing 350 are located on either side of projection lens 340. The openings are approximately adjacent to the projection lens 340. The term "approximately adjacent" as used herein is meant to denote a range of locations from immediately adjacent to the projection lens to several centimeters from the projection lens.

Although the projector 300 is shown with two blowers, other embodiments are possible using only one blower or more than two blowers. Further, other embodiments are possible using various types of blowers, and the blowers may be oriented in ways other than horizontal.

Thus, as previously explained, an embodiment involves a projector with a blower. The blower has an exhaust port that is mounted to a front surface of a housing that includes at least some of the projector's optical components, including for this example a polarizer. The exhaust port is coupled to an opening in the front surface of the housing. The opening is located approximately adjacent to a projection lens that extends from the front surface of the housing. Air is forced by the blower through the opening and across the polarizer. By allowing the air to enter the housing from the front, the turns and bends associated with prior projectors are reduced, and more efficient cooling may be realized. A smaller projector engine may also be achieved.

Figure 4:
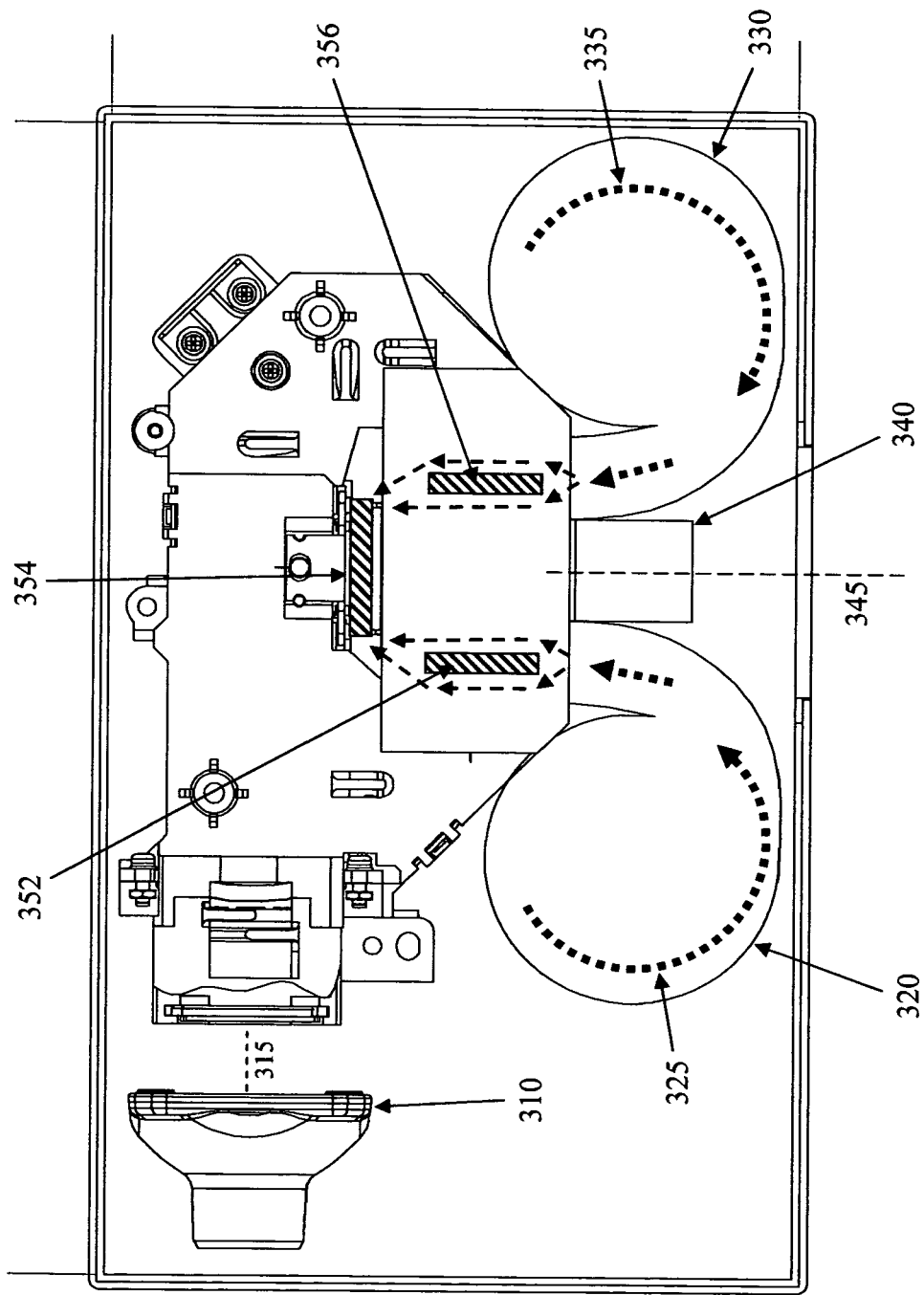
FIG. 4 is a top view of the embodiment of FIG. 3.

FIG. 4 is a top view of the embodiment of FIG. 3. This top view again shows lamp 310 and projection lens 340. Lamp 310 provides a beam of light 315 which makes its way through projector 300. Output beam of light 345 emanates from the projection lens 340.

Also shown in this top view of example projector 300 are streams of air 325 and 335, shown for illustrative purposes. These example streams are created by blowers 320 and 330, respectively. Streams 325 and 335 enter the housing and are directed toward components 352 and 356. Once air streams 325 and 335 pass across at least some of the surfaces of components 352 and 356, streams 325 and 335 are directed to component 354. Components 352, 354, and 356 are contained within housing 350. Components 352, 354, and 356 may include any of a number of types of components, including inlet and exit polarizers and LCD panels. Further, any of a wide range of possible component arrangements and configurations are possible. For example, other embodiments may use technologies other than LCD based engines.

Once air streams 325 and 335 pass across at least one of the surfaces of the component 354, at least a portion of the air streams may be directed up out of housing 350, or may be directed down out of housing 350, or may be directed toward lamp 310. Other embodiments are possible with other air flow arrangements.

Figure 5:
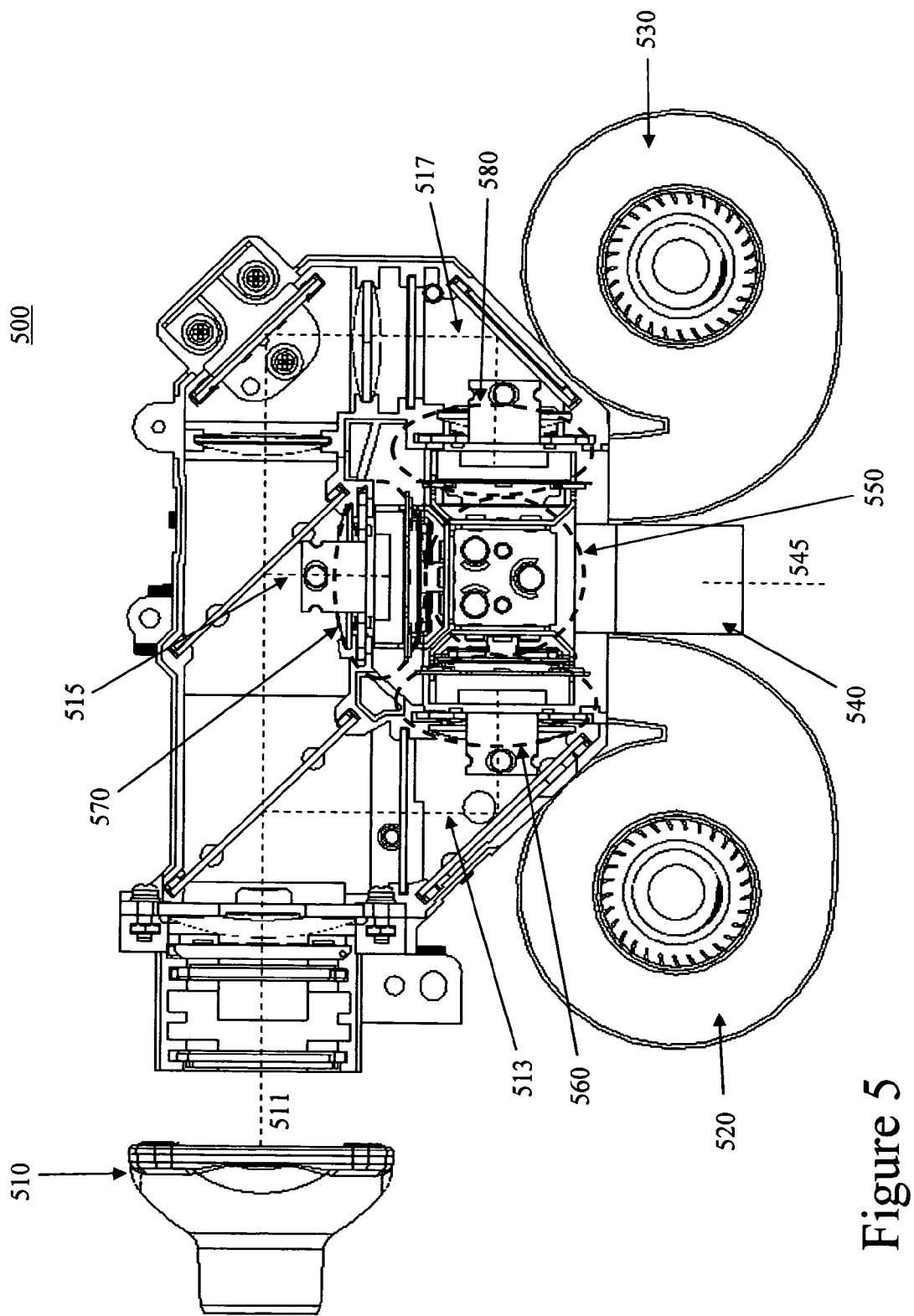
FIG. 5 is a top view of one embodiment of an example projector engine.

FIG. 5 is a top view of one embodiment of a portion of an example projector engine 500 showing one possible arrangement of red, green, and blue light channels. Projector engine 500 includes a lamp 510. The lamp provides a beam of light 511. Beam of light 511 passes through and bounces off various lens and mirrors to produce a green beam 513, a red beam 515, and a blue beam 517. Beams 513, 515, and 517 arrive at optical component assemblies 560, 570, and 580, respectively. Assemblies 560, 570, and 580 may include an inlet polarizer, an LCD panel, and an exit polarizer. Assemblies 560, 570, and 580 are arranged around an x-cube 550. The polarizers, the LCD panels, and the x-cube operate in ways that are well-known in the art, and will not be discussed in detail.

Assemblies 560 and 580 process the green and blue light beams, respectively. Because the green and blue beams contain more energy than the red beam, assemblies 560 and 580 are positioned so that streams of air from blowers 520 and 530 reach assemblies 560 and 580 before being directed to assembly 570. In this way, efficient cooling of the blue and green beam components may be achieved.

Figure 6:
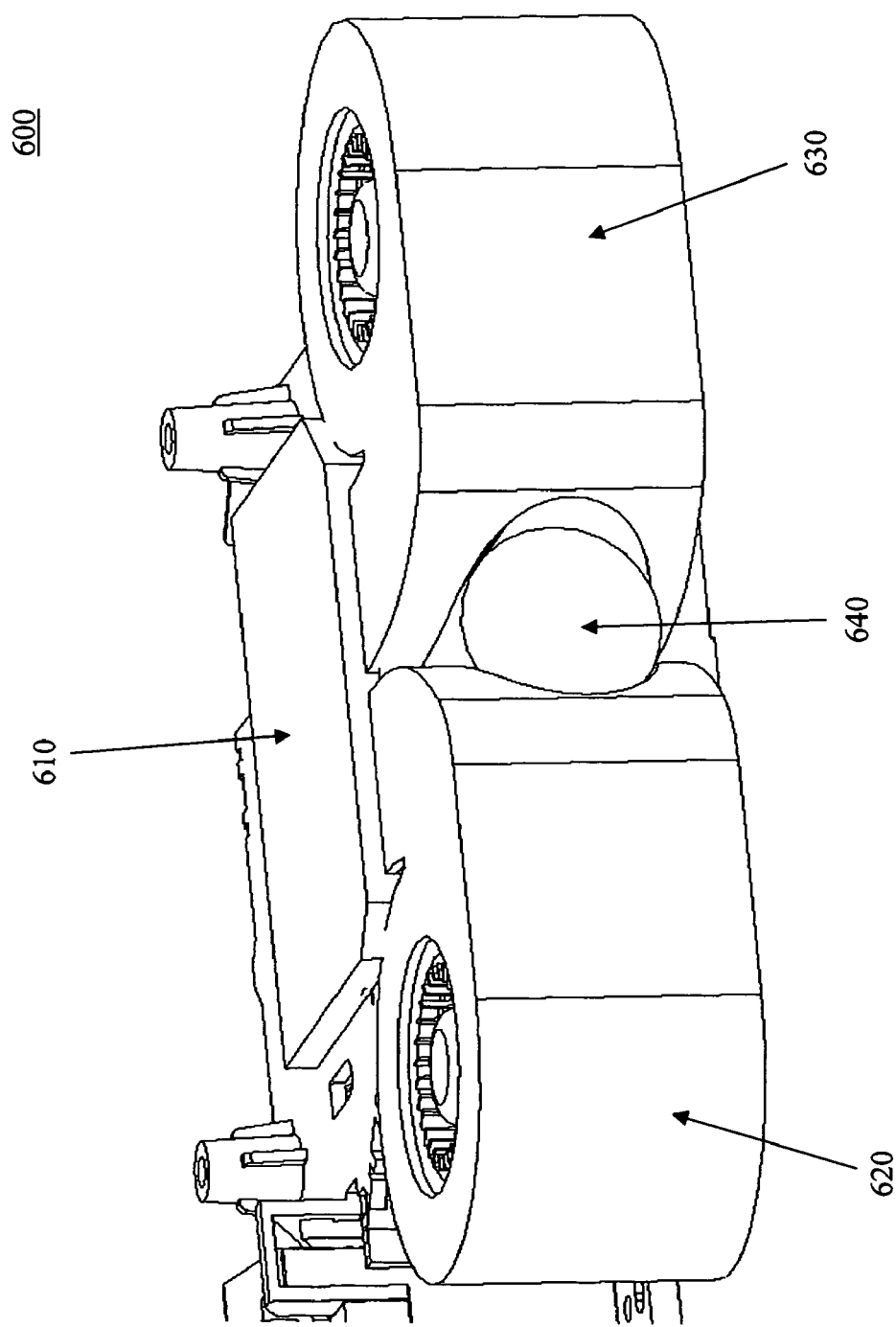
FIG. 6 is a perspective view of another embodiment of an example projector engine.

FIG. 6 is a perspective view of one embodiment of an example projector engine 600 with blowers 620 and 630 mounted horizontally to a housing 610 with blowers 620 and 630 configured to allow a larger projection lens 640. Blowers 620 and 630 are shaped to partially surround projection lens 640. Blowers 620 and 630 may be shaped to allow a wide range of projection lens diameters.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification the claimed subject matter has been described with reference to specific example embodiments thereof. It will, however, be evident that various modifications and changes may be made thereto without departing from the broader spirit and scope of the subject matter as set forth in the appended claims. The specification and drawings are, accordingly, to be regarded in an illustrative rather than in a restrictive sense.

What is claimed is:

1. An apparatus, comprising
a housing having a front surface;
an x-cube polarizer;
a projection lens; and
a blower including an exhaust port, the exhaust port coupled to an opening approximately adjacent to the projection lens in the front surface of the housing, wherein the housing further includes a port to horizontally channel air from the blower horizontally past a polarizer;
wherein a lateral distance between the opening and the projection lens is approximately the same or less than a lateral distance between the x-cube polarizer and the projection lens.

2. The apparatus of claim 1, further comprising a liquid crystal display (LCD) device adjacent to the polarizer.

3. The apparatus of claim 2, the port to channel air from the blower to both the LCD device and the polarizer.

4. The apparatus of claim 3, wherein the polarizer is an exit polarizer.

5. The apparatus of claim 4, the blower arranged in a horizontal fashion.

6. A projection display system, comprising:
a housing having a front surface;
an x-cube contained within the housing, the x-cube including a first side, a second side, a third side, and a fourth side;
a projection lens extending from the housing, the projection lens to transmit light emitted from the fourth side of the x-cube;
a first inlet polarizer coupled to a first LCD panel, the first LCD panel further coupled to a first exit polarizer, the first exit polarizer located between the first LCD panel and the first side of the x-cube;
a first blower including an exhaust port, the exhaust port coupled to an opening approximately adjacent to the projection lens in the front surface of the housing, wherein the housing further includes a port to horizontally channel a stream of air from the first blower horizontally past the first inlet polarizer, the first LCD panel, and the first exit polarizer;
a second inlet polarizer coupled to a second LCD panel, the second LCD panel further coupled to a second exit polarizer, the second exit polarizer located between the second LCD panel and the second side of the x-cube;
a third inlet polarizer coupled to a third LCD panel, the third LCD panel further coupled to a third exit polarizer, the third exit polarizer located between the third LCD panel and the third side of the x-cube; and
a second blower including an exhaust port, the exhaust port coupled to an additional opening approximately adjacent to the projection lens in the front surface of the housing.

7. The system of claim 6, the housing further including a second port to horizontally channel a stream of air from the second blower horizontally past the second inlet polarizer, the second LCD panel, and the second exit polarizer.

8. The system of claim 7, the stream of the air from the first blower to be horizontally directed to the third inlet polarizer, the third LCD panel, and the third exit polarizer after the stream of air from the first blower passes across at least one surface of the first inlet polarizer, the first LCD panel, and the first exit polarizer.

9. The system of claim 8, the stream of air from the second blower to be horizontally directed to the third inlet polarizer, the third LCD panel, and the third exit polarizer after the stream of air from the second blower passes across at least one surface of the second inlet polarizer, the second LCD panel, and the second exit polarizer.

10. The system of claim 9, further comprising a lamp to produce a beam of light, the beam of light to be divided into separate beams of red, green, and blue light, the green beam passing through the first inlet polarizer, the first LCD panel, and the first exit polarizer before entering the x-cube, the blue beam passing through the second inlet polarizer, the second LCD panel, and the second exit polarizer before entering the x-cube, and the red beam passing through the third inlet polarizer, the third LCD panel, and the third exit polarizer before entering the x-cube.

11. The projection display system of claim 6, wherein a lateral distance between the opening and the projection lens is approximately the same or less than a lateral distance between the first side of the x-cube polarizer and the projection lens.

12. A method, comprising:
  directing a stream of air along a path with no sharp turns or bends to cool optical components of a projector system, the stream being directed through an opening in a front surface of a housing to a first polarizer component and to a first LCD panel, to a second LCD panel and a second polarizer after the stream of air passes across at least one surface of the first polarizer and the first LCD panel, and down out of the housing once the stream of air has passed across at least one surface of the second LCD panel and the second polarizer.

13. The method of claim 12, further comprising directing at least a portion of the stream of air toward a lamp once the stream of air has passed across at least one surface of the second LCD panel and the second polarizer.

14. A method, comprising:
  directing a stream of air from an opening in a front surface of a housing across at least one surface of an optical component situated to process a green beam of light; and
  directing the stream of air to an optical component situated to process a red beam of light after the stream of air has been directed across the at least one surface of an optical component situated to process the green beam of light.

15. The method of claim 14, further comprising directing the stream of air along a path with no sharp turns or bends.

16. A method, comprising:
  directing a stream of air from an opening in a front surface of a housing across at least one surface of an optical component situated to process a blue beam of light; and
  directing the stream of air to an optical component situated to process a red beam of light after the stream of air has been directed across the at least one surface of an optical component situated to process the blue beam of light.

17. The method of claim 16, further comprising directing the stream of air along a path with no sharp turns or bends.

18. A method, comprising:
  directing a stream of air through an opening in a front surface of a housing and along a path with no sharp turns or bends through a projector system to cool optical components of the projector system by directing the stream of air horizontally past the optical components, wherein directing a stream of air includes directing a stream of air through an opening in the front surface of the housing which is laterally spaced away from the projection lens by approximately the same as or less than an x-cube polarizer is laterally spaced away from the projection lens.

* * * * *